(12) United States Patent
Hom et al.

(10) Patent No.: US 10,114,853 B2
(45) Date of Patent: *Oct. 30, 2018

(54) OPTIMIZING THE INITIALIZATION OF A QUEUE VIA A BATCH OPERATION

(71) Applicant: INTERNATIONAL BUSINESS MACHINES CORPORATION, Armonk, NY (US)

(72) Inventors: David Hom, Poughkeepsie, NY (US); Charles E. Mari, Wappingers Falls, NY (US); Robert J. Miller, Jr., Poughkeepsie, NY (US); Harris M. Morgenstern, Wappingers Falls, NY (US); Elpida Tzortzatos, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,610

(22) Filed: Sep. 4, 2015

(65) Prior Publication Data

US 2016/0274943 A1    Sep. 22, 2016

Related U.S. Application Data

(63) Continuation of application No. 14/658,729, filed on Mar. 16, 2015, now Pat. No. 9,922,069.

(51) Int. Cl.
*G06F 9/52* (2006.01)
*G06F 17/30* (2006.01)

(52) U.S. Cl.
CPC ........ *G06F 17/30371* (2013.01); *G06F 9/526* (2013.01); *G06F 17/30368* (2013.01)

(58) Field of Classification Search
None
See application file for complete search history.

(56) References Cited

U.S. PATENT DOCUMENTS

| 5,168,570 | A | * | 12/1992 | Eckert | G06F 8/433 710/241 |
| 5,557,607 | A | * | 9/1996 | Holden | H04L 12/5601 370/395.31 |
| 8,261,029 | B1 | * | 9/2012 | Marshak | G06F 3/0613 370/444 |
| 8,458,721 | B2 | * | 6/2013 | Marathe | G06F 9/526 718/107 |

(Continued)

*Primary Examiner* — Diem Cao
*Assistant Examiner* — Zhi Chen
(74) *Attorney, Agent, or Firm* — Cantor Colburn LLP; William A. Kinnaman, Jr.

(57) ABSTRACT

A method, a computer program product, and a system for performing a batch processing are provided. The batch processing includes initializing a set of elements corresponding to a set of resources to produce an initialized group and chaining the initialized group to previously initialized elements to produce an element batch, when the previously initialized elements are available. The batch processing further includes setting a system lock on the set of resources after the element batch is produced; executing a service routine to move the element batch to a queue by referencing first and last elements of the element batch; and releasing the system lock on the set of resources once the service routine is complete.

3 Claims, 4 Drawing Sheets

(56) References Cited

U.S. PATENT DOCUMENTS

| | | | | |
|---|---|---|---|---|
| 8,743,907 B1* | 6/2014 | Kadosh | ............... | H04L 47/34 |
| | | | | 370/394 |
| 2002/0184573 A1* | 12/2002 | Rousseau | ......... | H04L 12/40123 |
| | | | | 714/43 |
| 2007/0074215 A1* | 3/2007 | Bethea | .................... | H04L 67/02 |
| | | | | 718/101 |
| 2013/0194922 A1* | 8/2013 | Sukonik | ................. | H04L 47/60 |
| | | | | 370/230 |
| 2015/0248631 A1* | 9/2015 | Brown | ............. | G06Q 10/06316 |
| | | | | 705/7.26 |
| 2015/0261808 A1* | 9/2015 | Zhou | ................ | G06F 17/30368 |
| | | | | 707/703 |

* cited by examiner

OPTIMIZING THE INITIALIZATION OF A QUEUE VIA A BATCH OPERATION

DOMESTIC PRIORITY

This application is a continuation of U.S. application Ser. No. 14/658,729, filed on Mar. 16, 2015, the disclosure of which is incorporated by reference herein in its entirety.

BACKGROUND

The present disclosure relates generally to optimizing the initialization of a queue via a batch operation, and more specifically, to improving, via a batch operation, the processing involved in populating a queue of elements while maintaining proper serialization to ensure the integrity and accuracy of the queue.

In general, when a queue of elements is being initialized (e.g., queue initialization), a service routine is called/executed by the processor for each individual element being moved to the queue. This service routine separately handles queuing of the individual element and housekeeping associated with the queue (e.g., updating counts, creating appropriate trace entries, etc.). Further, as each element represents a resource within a system, proper serialization via a system lock must be maintained throughout queue initializations to prevent premature use of resources represented by the queue elements and to ensure the integrity and accuracy of the queue. In this way, contemporary approaches to queue initialization is a 'one at a time' processing.

This 'one at a time' processing leads to high lock contention of resources since the system lock used for a queue also serializes other system resources. Further, other processes that need the system lock must wait until the queue initialization is complete, which causes ripple delays. In addition, in cases where the number of elements on the queue grows based on the size of the system, the overhead processing time associated with queue initialization increases significantly as the size of the system increases. With size increases, scalability issues arise with respect to memory capacity, a number of supported devices, a number of supported processors, etc.

SUMMARY

Embodiments include a method, system, and computer program product for performing a batch processing. The batch processing includes initializing a set of elements corresponding to a set of resources to produce an initialized group and chaining the initialized group to previously initialized elements to produce an element batch, when the previously initialized elements are available. The batch processing further includes setting a system lock on the set of resources after the element batch is produced; executing a service routine to move the element batch to a queue by referencing first and last elements of the element batch; and releasing the system lock on the set of resources once the service routine is complete.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
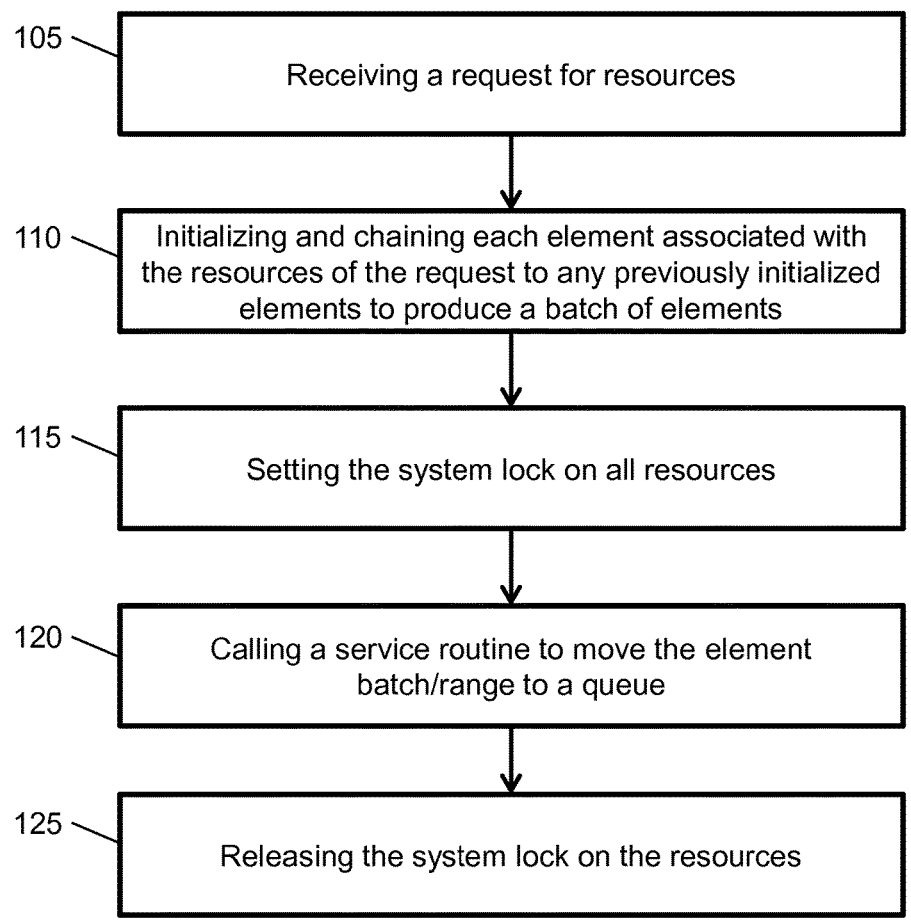
FIG. 1 depicts a process flow for a batch operation in accordance with an embodiment.

Embodiments described herein relate to improving, via a batch operation, the processing involved in populating a queue of elements of a computer system while maintaining proper serialization to ensure the integrity and accuracy of the queue. The batch processing can extend to any queue of any resources to optimally manage any request to return a batch of resources. For example, embodiments herein provide a method executed within a processor of a computer system to manage a global queue of the processor with respect to real storage of the computer system.

The batch processing described herein is necessarily rooted in the computer system to perform proactive operations to overcome problems specifically arising in the realm of queue initialization of that computer system with respect to serializing resources (e.g., these problems include the extended system locks, ripple delays, and/or processing overhead that result in unwanted computational costs and expenses). For example, in view of contemporary approaches of moving elements one at a time and holding a system lock throughout this entire moving process are non-optimal, the embodiments of batch operations described herein (coupled with holding the system lock only when necessary) reduce and/or eliminate locks, delays, and overhead specifically arising in the realm of contemporary queue initialization.

In general, a computer system is any physical or virtual electronic device with at least one processor and at least one memory (an example of a computer system is further described below with respect to FIG. 3). The processor can further include multiple engines or cores operating concurrently. The computer system can employ an embodiment of serializing resources via the processor as described herein.

A resource can be any physical or virtual component of limited availability within the computer system. Example resources include, but are not limited to, electronic devices connected to the computer system, internal system components, virtual system resources, network connections, and memory areas. Managing resources can be referred to as resource management, and includes resource serialization, managing resource locks, and managing queues of elements corresponding to the resources.

Resource serialization is a coordination of access to the resources, when the resources are used by more than one application. Examples of operations carried out by resource serialization include granting exclusive access to data for an application and granting shared access to data for applications.

A system lock, in general, is a hold or a freeze on a resource that prevents access to that resource (e.g., releasing a resource when a process has finished using it and dealing with resource contention when multiple processes wish to access a limited resource). For example, if 10 different processors of the computer system are attempting to access a specific resource, a system lock is employed on that specific resource to serialize access (exclusive and shared access to a specific resource). The system lock may also be referred to as a resource lock, a resource queue lock, and/or processor lock.

A queue is an abstract data type in which entities or elements in the queue are kept in order. The elements can be addresses pointing to the resources (e.g., represent real storage frames). The operations of the queue include the addition of elements to a rear terminal position (known as enqueue) and removal of entities from the front terminal position (known as dequeue). The operations of the queue also support/allow adding to a beginning (front) of a queue and removing from an end of the queue. One example of a queue can include a double threaded queue of elements that includes forward and backward pointers moving from first to last. The double threaded queue can be located on and managed by the processor of the computer system, with the elements pointing to real storage frames stored on a central storage of the processor. The queue can be a global queue that is centralized structure for referencing/modifying elements. Note that the queue can be constructed and managed via hardware and/or software.

Embodiments of batch operations will now be described with respect to FIGS. 1-2B. Turning now to FIG. 1, a process flow 100 is generally shown in accordance with an embodiment. The process flow 100 begins at block 105, where a processor of a computer system receives a request for resources. A set of elements corresponds to the resources of this request. These elements, at block 110, are then initialized and chained by the processor to any previously initialized elements, which results in a batch or range of elements. Note that elements are initialized and chained while not holding a system lock.

The batch size may be variable, as the processor (or engine) that manages the batch move can manage variably sized batches (i.e., dynamically adjust the batch sizes) from a single element to infinite elements. In the case of initializing all real storage of the computer system, increment sizes of the real storage can dictate the batch size that will be initialized. In other cases, a component or resource itself can apply a limiting number to the batch size. In another case, a size of a request for resources can dictate the batch size. In turn, the queue size can also be variable.

Once all elements are initialized and ready to be moved to the queue, the process flow 100 proceeds to block 115, where the processor sets a system lock on the resources associated with the batch or range of elements. At block 120, a service routine is called by the processor to move the batch or range of elements to the queue. Note the service routine called by the processor is configured to manage both single element requests and the batch queue request of block 105. The service routine does not examine each element in the batch or range of elements, as the service routine only references the elements needed to add the batch to the queue. In this way, the processor utilizes the service routine to reference first and last elements of the batch or range of elements to add them to the queue (e.g., the 'middle' elements are not referenced by the service routine). The service can avoid access to the resources once the lock is held. Note that other hardware and/or software, such as virtual engines, physical processor cores, call the service routine. Once the batch or range of elements is moved and once the resources are referenced, the system lock on the resources associated with the batch or range of elements is released by the processor as shown in block 125.

Figure 2A:
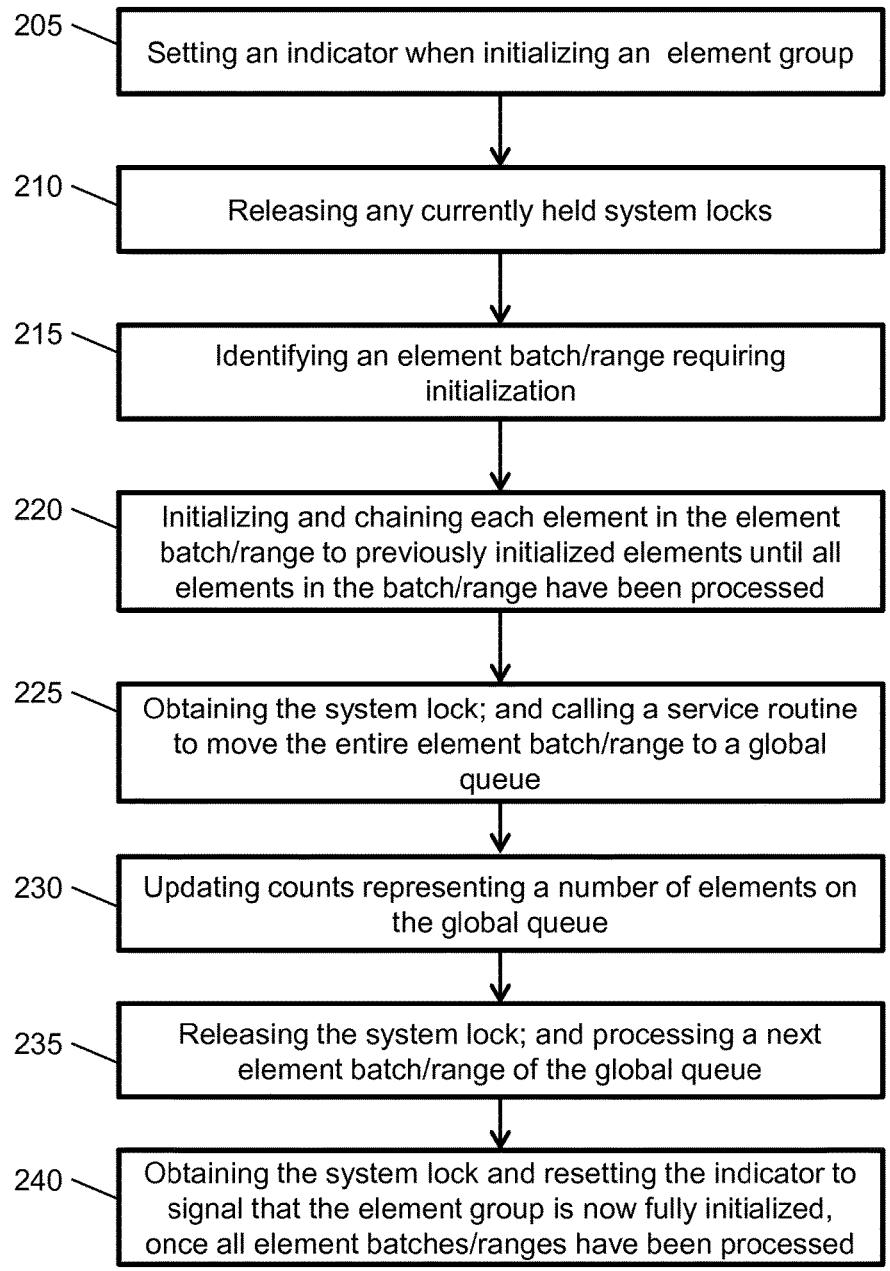
FIG. 2A depicts another process flow for a batch operation in accordance with an embodiment.
Figure 2B:
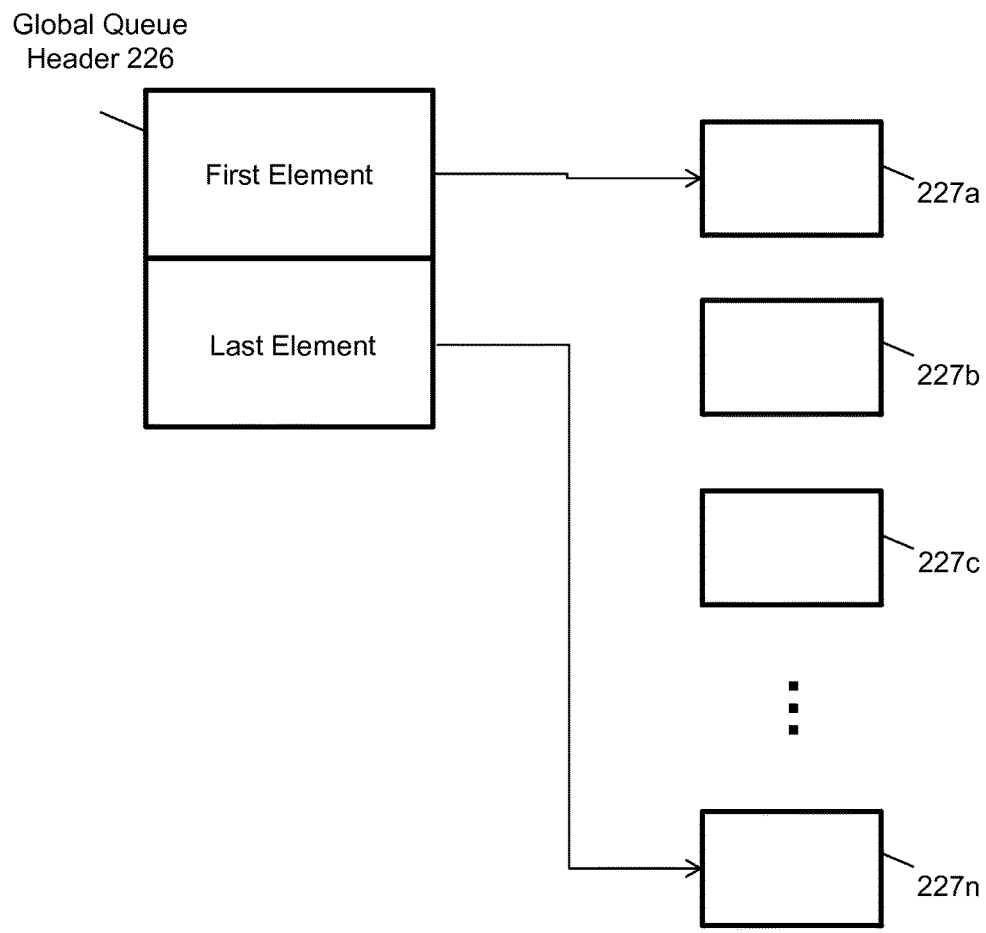
FIG. 2B illustrates an operation of a global queue in accordance with an embodiment.

Turning now to FIG. 2A, a process flow 200 is generally shown in accordance with an embodiment. The process flow 200 can begin after a processor of a computer system receives a request for resources. That is, after the request is received, the process flow 200 can proceed to block 205. At block 205, an indicator is set to signify that an element group is being initialized and is not yet available with respect to the indicator of block 225 below. For example, the indicator can be a Boolean operator that indicates when a corresponding increment of real storage is not available or is available (the indicator can be set when the initialization is complete, indicating that the element group is now available). Other processes in the computer system, which are attempting to access the elements being initialized, are updated to check the indicator to verify that the elements are available for use. This ensures that the elements will not be used prematurely even though the system lock is not held. Further, the indicator can be one of a plurality of indicators corresponding to a plurality of increments of the real storage, and the plurality of indicators can be located on or reside in the virtual storage.

Next, at block 210, the processor releases any currently held system locks (and in turn release any corresponding indicators other than the indicator of block 205). Then, at block 215, the processor identifies an element batch/range (with respect to the element group) requiring initialization. At block 220, all elements identified in the element batch/range are then initialized by the processor. These elements are further chained to any previously initialized elements until all elements in the batch/range have been processed, which results in a current element batch.

Next, at block 225, the processor obtains a system lock (which matches the indicator of block 205) on the resources associated with the current element batch. Further, the processor calls a service routine to move the current element batch to a global queue. The service routine can support an option of adding a new batch of elements to the beginning or end of the existing global queue, based on a caller of the service routine passing an indicator of the desired placement of the new batch of elements.

If adding to the beginning of an existing global queue, the last element in the new batch is queued to the first element of the existing global queue. The pointer to the first element in the queue header is updated with the address of the new first element. If adding to the end of the existing global queue, the first element in the new batch is queued to the last element of the existing global queue. The pointer to the last element in the queue header is updated with the address of the new last element. For example, FIG. 2B illustrates an operation 225B of a global queue. In FIG. 2B, a global queue header 226 has first and last elements that point respectively to elements 227a and 227n. In this way, middle elements 227b and 227n-1 are not referenced when adding a new batch to the global queue. Note that all elements on the global queue are chained via a forward and backward pointer (not shown in FIG. 2B).

Then, at block 230, the processor updates counts representing a number of elements on the global queue. Then, with the resources processed and the queue updated, the system lock on the resources associated with the current element batch is released by the processor as shown in block 235. Further, the processor begins processing a next element batch/range of the global queue. Then, at block 240, the processor obtains another system lock and resets the indicator to signal that the element group is now fully initialized (once all element batches/ranges have been processed for the next element batch/range).

An application of the above embodiments can relate to the initialization of real storage available frame queues of a computer system that is performed by the Real Storage Manager (RSM). Each element on these queues can represent a 4K block of real storage. As the amount of real storage supported on the computer system grows into the terabyte range, these queues grow to extremely large lengths (e.g., 1 TB of real storage requires approximately 268 million elements). In contrast to conventional approaches that result in various problems when dealing with queues of such length (e.g., increased system initial program load times, lock contention, delays in running other system initialization routines that rely on the completion of real storage initialization), the application of the above embodiments maintains acceptable real storage initialization times on the computer system with such large real memory configurations.

In view of the above, a computer system will now be described with respect to FIG. 3. Referring now to FIG. 3, there is shown an embodiment of a processing system 300 (i.e., a computer system) for implementing the teachings herein. In this embodiment, the processing system 300 has one or more central processing units (processors) 301a, 301b, 301c, etc. (collectively or generically referred to as processor(s) 301). The processors 301, also referred to as processing circuits, are coupled via a system bus 302 to system memory 303 and various other components. The system memory 303 can include read only memory (ROM) 304 and random access memory (RAM) 305. The ROM 304 is coupled to system bus 302 and may include a basic input/output system (BIOS), which controls certain basic functions of the processing system 300. RAM is read-write memory coupled to system bus 302 for use by processors 301.

Figure 3:
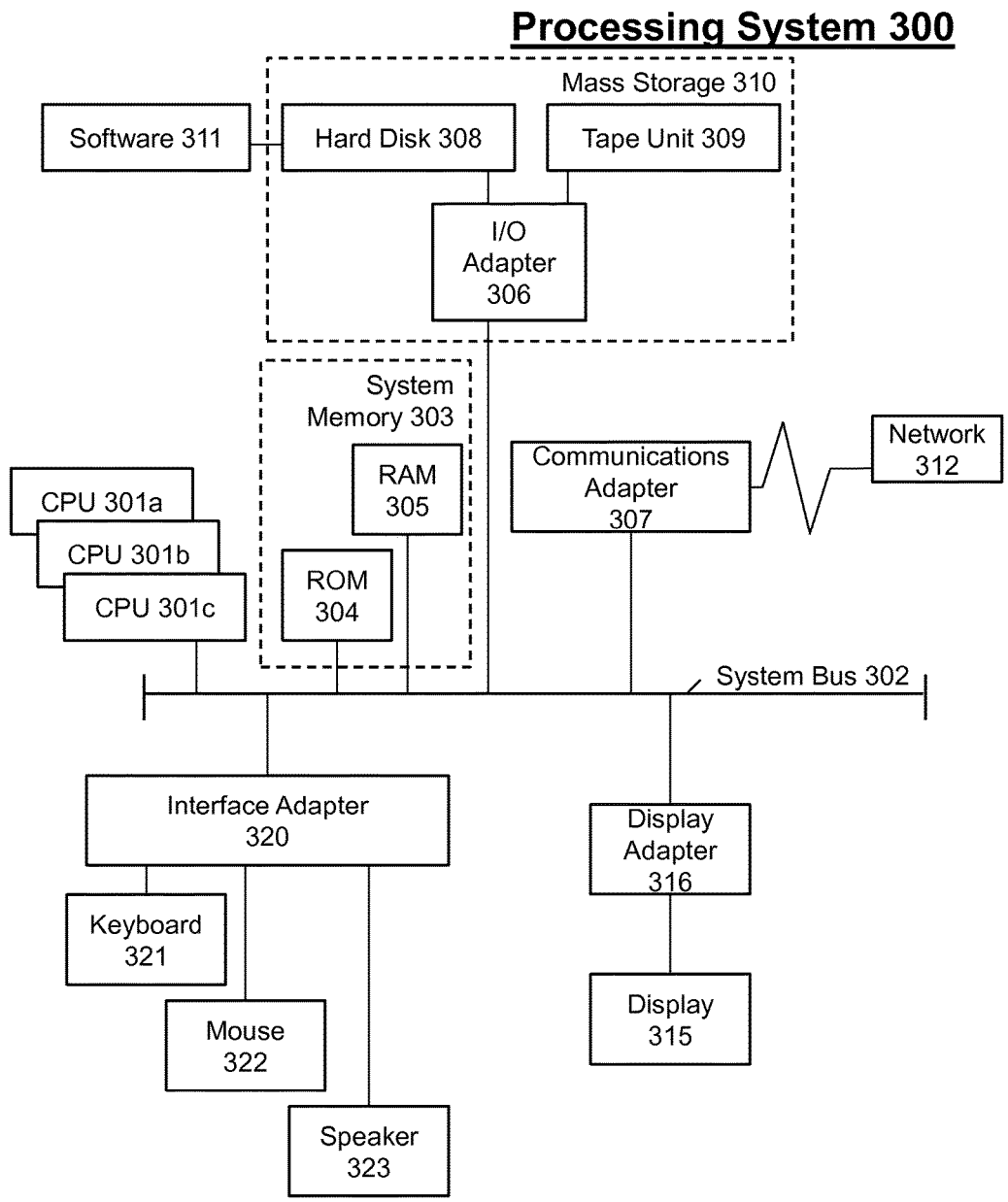
FIG. 3 depicts a processing system in accordance with an embodiment.

FIG. 3 further depicts an input/output (I/O) adapter 306 and a network adapter 307 coupled to the system bus 302. I/O adapter 306 may be a small computer system interface (SCSI) adapter that communicates with a hard disk 308 and/or tape storage drive 309 or any other similar component. I/O adapter 306, hard disk 308, and tape storage drive 309 are collectively referred to herein as mass storage 310. Software 311 for execution on processing system 300 may be stored in mass storage 310. The mass storage 310 is an example of a tangible storage medium readable by the processors 301, where the software 311 is stored as instructions for execution by the processors 301 to perform a method, such as the process flows of FIGS. 1-2. Network adapter 307 interconnects system bus 302 with an outside network 312 enabling processing system 300 to communicate with other such systems. A screen (e.g., a display monitor) 315 is connected to system bus 302 by display adapter 316, which may include a graphics controller to improve the performance of graphics intensive applications and a video controller. In one embodiment, adapters 306, 307, and 316 may be connected to one or more I/O buses that are connected to system bus 302 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 302 via an interface adapter 320 and the display adapter 316. A keyboard 321, mouse 322, and speaker 323 can be interconnected to system bus 302 via interface adapter 320, which may include, for example, a Super I/O chip integrating multiple device adapters into a single integrated circuit.

Thus, as configured in FIG. 3, processing system 305 includes processing capability in the form of processors 301, and, storage capability including system memory 303 and mass storage 310, input means such as keyboard 321 and mouse 322, and output capability including speaker 323 and display 315. In one embodiment, a portion of system memory 303 and mass storage 310 collectively store an operating system, such as the z/OS or AIX operating system from IBM Corporation, to coordinate the functions of the various components shown in FIG. 3.

Technical effects and benefits include reducing usage of system lock by holding the system lock when a batch of elements is moved to a queue rather than holding it throughout an entire initialization and queueing process. Further, technical effects and benefits include improved scalability for computer systems where a number of queue elements increases as the size of the system increases. Technical effects and benefits also include a reduced path length when initializing a queue since the service routine is called once per batch rather than once per element. In this way, the technical effects and benefits an increased efficiency via the batch processing since only the first and last elements are references while the middle elements are no referenced.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing a patch processing, comprising:
   initializing, by a processor coupled to a memory, a set of elements corresponding to a first set of resources to produce an initialized group,
   wherein the initializing of the set of elements is performed without a system lock on at least the first set of resources;

setting an indicator signifying that the set of elements are not available prior to the system lock on at least the first set of resources while the set of elements is being initialized, wherein the indicator is checked by a second processor attempting to access the set of elements to verify whether the set of elements are available for use;

chaining, by the processor, the initialized group to previously initialized elements to produce an element batch when the previously initialized elements are available, wherein the chaining of the initialized group is performed without the system lock on at least the first set of resources, and wherein the previously initialized elements correspond to a second set of resources;

obtaining, by the processor, a system lock on at least the first and second sets of resources in accordance with the element batch after the initialized group is chained to the previously initialized elements;

executing, by the processor, a service routine to move the element batch to a queue, wherein the service routine increases an efficiency of the batch processing by referencing only first and last elements of the element batch and not middle elements of the element batch; and updating counts representing a number of elements on the queue to correspond to the service routine; and releasing the system lock on at least the first and second sets of resources once the service routine is complete and resetting the indicator to signal that the set of elements is fully initialized once all elements in the element batch have been processed, wherein each element of the set of elements is an address pointing to a corresponding resource of the first set of resources, wherein all elements on the queue are chained via a forward and backward pointer.

2. The method of claim 1, further comprising:

receiving a request for resources, the request for resources corresponding to the set of elements.

3. The method of claim 1, wherein a size of the element batch corresponds to an increment size of the first and second sets of resources.

* * * * *